United States Patent
McCarthy

(10) Patent No.: US 9,939,194 B2
(45) Date of Patent: Apr. 10, 2018

(54) ISOLATED POWER NETWORKS WITHIN AN ALL-ELECTRIC LNG PLANT AND METHODS FOR OPERATING SAME

(71) Applicant: KELLOGG BROWN & ROOT LLC, Houston, TX (US)

(72) Inventor: Keith McCarthy, Houston, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 816 days.

(21) Appl. No.: 14/520,093

(22) Filed: Oct. 21, 2014

(65) Prior Publication Data

US 2016/0109179 A1   Apr. 21, 2016

(51) Int. Cl.

| | |
|---|---|
| F25J 1/00 | (2006.01) |
| H02J 1/00 | (2006.01) |
| F25J 1/02 | (2006.01) |
| H02J 3/00 | (2006.01) |
| F04B 17/03 | (2006.01) |
| H02J 3/30 | (2006.01) |
| F04D 25/06 | (2006.01) |
| F04D 25/16 | (2006.01) |

(52) U.S. Cl.
CPC ............. *F25J 1/0284* (2013.01); *F04B 17/03* (2013.01); *F04D 25/06* (2013.01); *F04D 25/16* (2013.01); *F25J 1/0022* (2013.01); *F25J 1/0269* (2013.01); *F25J 1/0298* (2013.01); *H02J 3/00* (2013.01); *H02J 3/30* (2013.01); *F25J 2240/80* (2013.01); *Y02E 60/16* (2013.01)

(58) Field of Classification Search
CPC ........ F25J 1/0248; F25J 1/0022; F25J 1/0298; F25J 2240/80; F04B 17/03; F04D 25/06; F04D 25/16; H02J 3/00; H02J 3/30; Y02E 60/16

USPC ......... 62/611, 612, 613, 618, 510, 606, 626; 417/53, 223, 271, 415; 307/16, 28; 318/723
See application file for complete search history.

(56) References Cited

U.S. PATENT DOCUMENTS

| | | | |
|---|---|---|---|
| 3,724,229 A * | 4/1973 | Seliber .................. | C02F 1/04 62/123 |
| 4,541,852 A * | 9/1985 | Newton ................. | F25J 1/0022 62/613 |
| 6,389,844 B1 * | 5/2002 | Klein Nagel Voort ................... | F25J 1/0284 62/612 |
| 6,640,586 B1 * | 11/2003 | Baudat ................. | F25J 1/0284 62/612 |
| 6,691,531 B1 * | 2/2004 | Martinez ............... | F25J 1/0022 62/612 |
| 7,114,351 B2 * | 10/2006 | Jones, Jr. ............... | F25J 1/0022 62/611 |

(Continued)

*Primary Examiner* — Thai Ba Trieu
(74) *Attorney, Agent, or Firm* — Gary Machetta

(57) ABSTRACT

Embodiments generally relate to a motor driven compressor (MDC) power network electrically isolated and independent from a balance of plant (BOP) power network within an electrical power system and methods for operating the same. In one embodiment, the MDC power network can include one or more MDC trains, and each of the MDC trains can include an MDC distribution bus, one or more MDC turbine generators, one or more electric motors, and one or more compressors. The BOP power network can include a BOP distribution bus, one or more BOP turbine generators, and one or more plant circuits comprising the balance of the plant.

20 Claims, 2 Drawing Sheets

114: switch – one or more circuit breakers, safety switches, disconnect switches, fuses, control switches, switchgears (e.g., train switchgears or other de-energizing devices), controllers, or other control devices 130: ASD – one or more soft starters, variable frequency drives (VFD), variable speed drives (VSD), variable speed drive systems (VSDS), adjustable frequency drives (AFD), direct-current (DC) drives, or any combination thereof 164: switch – one or more circuit breakers, safety switches, disconnect switches, fuses, control switches, switchgears (e.g., train switchgears or other de-energizing devices), controllers, or other control devices 180, 182, 184: BOP electrical loads – for example, secondary production lines, administration buildings and/or various process or non-process auxiliary loads N: number of liquefaction trains – 1-20, 25, 30, or more

(56) References Cited

U.S. PATENT DOCUMENTS

| | | | |
|---|---|---|---|
| 7,600,395 B2* | 10/2009 | Eaton | F25J 1/0022 62/612 |
| 7,856,843 B2 | 12/2010 | Enis et al. | |
| 8,269,449 B2* | 9/2012 | Bjerknes | F01D 15/10 318/723 |
| 8,381,544 B2* | 2/2013 | Coyle | F25J 1/0022 62/618 |
| 8,436,488 B2* | 5/2013 | Giesselbach | H02P 5/00 318/723 |
| 8,517,693 B2* | 8/2013 | Martin | F25J 1/0022 417/223 |
| 8,591,199 B2* | 11/2013 | Martinez | F25J 1/0022 417/53 |
| 8,689,583 B2* | 4/2014 | Kolscheid | F25J 1/0022 62/612 |
| 9,003,828 B2* | 4/2015 | Bridgwood | F25J 1/0022 62/611 |
| 9,163,873 B2* | 10/2015 | Jakobsen | F25J 1/0022 |
| 2003/0000236 A1 | 1/2003 | Anderson et al. | |
| 2005/0116541 A1* | 6/2005 | Seiver | H02J 3/005 307/16 |
| 2007/0107465 A1* | 5/2007 | Turner | F25J 1/0022 62/613 |
| 2007/0193303 A1* | 8/2007 | Hawrysz | F25J 1/0022 62/612 |
| 2008/0271480 A1* | 11/2008 | Mak | F25J 1/0022 62/626 |
| 2010/0071409 A1* | 3/2010 | Kaart | F25J 1/0022 62/612 |
| 2010/0257895 A1* | 10/2010 | Balling | F25J 1/0022 62/611 |
| 2010/0313597 A1* | 12/2010 | Bridgwood | F25J 1/0283 62/612 |
| 2011/0067439 A1* | 3/2011 | Bridgwood | F25J 1/0283 62/606 |
| 2013/0145794 A1* | 6/2013 | Rasmussen | F25J 1/0022 62/611 |
| 2013/0175805 A1 | 7/2013 | Bernsten et al. | |
| 2014/0039707 A1* | 2/2014 | Curtis | F02D 25/00 700/288 |
| 2016/0040928 A1* | 2/2016 | Rasmussen | F25J 1/0022 62/613 |

* cited by examiner

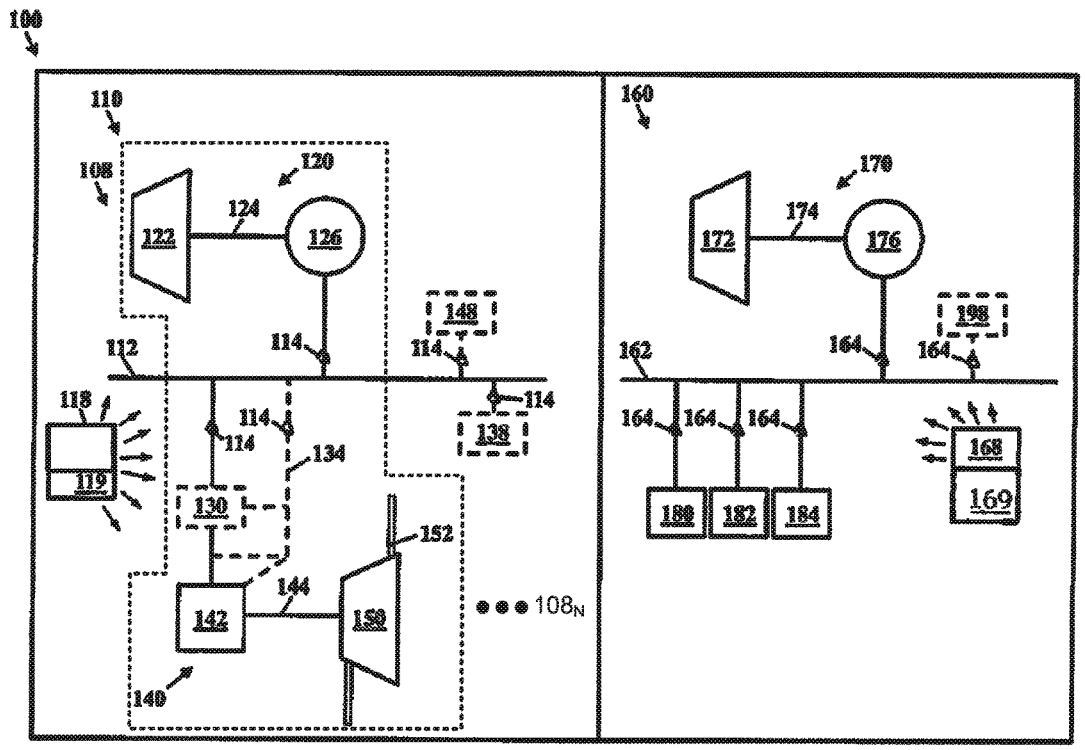

114: switch – one or more circuit breakers, safety switches, disconnect switches, fuses, control switches, switchgears (e.g., train switchgears or other de-energizing devices), controllers, or other control devices 130: ASD – one or more soft starters, variable frequency drives (VFD), variable speed drives (VSD), variable speed drive systems (VSDS), adjustable frequency drives (AFD), direct-current (DC) drives, or any combination thereof 164: switch – one or more circuit breakers, safety switches, disconnect switches, fuses, control switches, switchgears (e.g., train switchgears or other de-energizing devices), controllers, or other control devices 180, 182, 184: BOP electrical loads – for example, secondary production lines, administration buildings and/or various process or non-process auxiliary loads N: number of liquefaction trains – 1-20, 25, 30, or more

*Fig. 1*

ISOLATED POWER NETWORKS WITHIN AN ALL-ELECTRIC LNG PLANT AND METHODS FOR OPERATING SAME

BACKGROUND

Field

Embodiments described generally relate to systems and methods for generating and distributing electricity within a process plant. More particularly, embodiments relate to one or more motor driven compressor (MDC) power networks for an "all-electric" liquefied natural gas (LNG) liquefaction plant, each driving a separate process line or train, electrically isolated and independent from each other and from the balance-of-the-plant (BOP) power network, and methods for operating same.

Description of the Related Art

In the production of LNG and other liquefied gases and fluids, refrigeration compressors are often driven by gas turbines, steam turbines, or connected to other driver systems by belts or shafts. Multiple compressors acting together on the same process stream comprise a single process "train", in which a fault in, or required maintenance of, any one compressor or driver will shut down the entire process train. An LNG liquefaction plant consists of one or more process trains, designed to run independently of each other, plus overall plant facilities such as utilities, offsites (e.g. tankage and ship loading), and buildings (e.g. administration and workshops).

A conventional mechanical drive LNG plant design utilizes gas or steam turbines to drive the refrigeration compressors while a conventional "all-electric" design uses electric motors for the compressor drivers. In both designs the BOP electric power requirements are similar and both designs utilize a single interconnected overall electric power supply and distribution network connected to all the electrical loads throughout all trains and overall facilities of the entire plant.

In both the conventional gas turbine compressor and all-electric plant designs a single failure of any one compressor or driver (gas turbine or electric motor) will shut down its entire train, so neither has redundancy for refrigeration compression.

In both designs a failure of the single electrical network, which often includes multiple electric generators, will shut down the whole plant (all trains). Therefore, conventional designs provide a running spare ("spinning reserve") electric generator to allow the plant to "ride through" the loss of one generator. This design practice is known as "n+1" redundancy. However, any kind of electric fault in a single train, a single generator, the BOP, or the electric utility grid can still adversely affect the entire plant because they are interconnected in a single network.

The electrical generation and distribution network for the all-electric plant must be very much larger than that of a mechanical drive plant because the power requirement of the refrigeration compressors is an order of magnitude larger than the BOP.

Gas turbines are utilized in both conventional (as compressor drivers) and all-electric (as generator drivers) LNG trains and are designed to be most efficient when operated at full (maximum) or substantially near full load, minimizing emissions and fuel consumption. Consequently, operation of gas turbines at lower fuel rates will generally reduce efficiency and increase emissions, such as greenhouse gases including carbon dioxide and nitrogen oxides (e.g. $NO_x$).

Energy consumption of a typical liquefaction plant depends on the climate of the plant location and also will vary throughout the year due to different production demands, variable BOP loads, and fluctuations in weather conditions (e.g. ambient temperatures) with season and time-of-day. Gas turbine maximum output ratings also vary with ambient temperature, atmospheric pressure, and humidity. For example, in warmer climates, a gas turbine must be larger to overcome the adverse effects the maximum daily high temperature has on the ability of the gas turbine to power the associated compressor or generator. In cooler temperatures, the plant may require less power, therefore the turbine optimally scaled for the highest expected ambient temperature runs less efficiently. Such inefficiencies are indicative to increased greenhouse gas emissions by the gas turbine.

There is a need, therefore, for an electrical power system in an all-electric LNG liquefaction plant that resists being shut down due to electric faults and has increased fuel efficiency and decreased greenhouse gas emissions.

BRIEF DESCRIPTION OF THE DRAWINGS

FIG. 1 depicts a schematic of an illustrative electrical power system that can include a motor driven compressor (MDC) power network that can be electrically isolated from a balance of plant (BOP) power network, according to one or more embodiments described.

DETAILED DESCRIPTION

Figure 2:
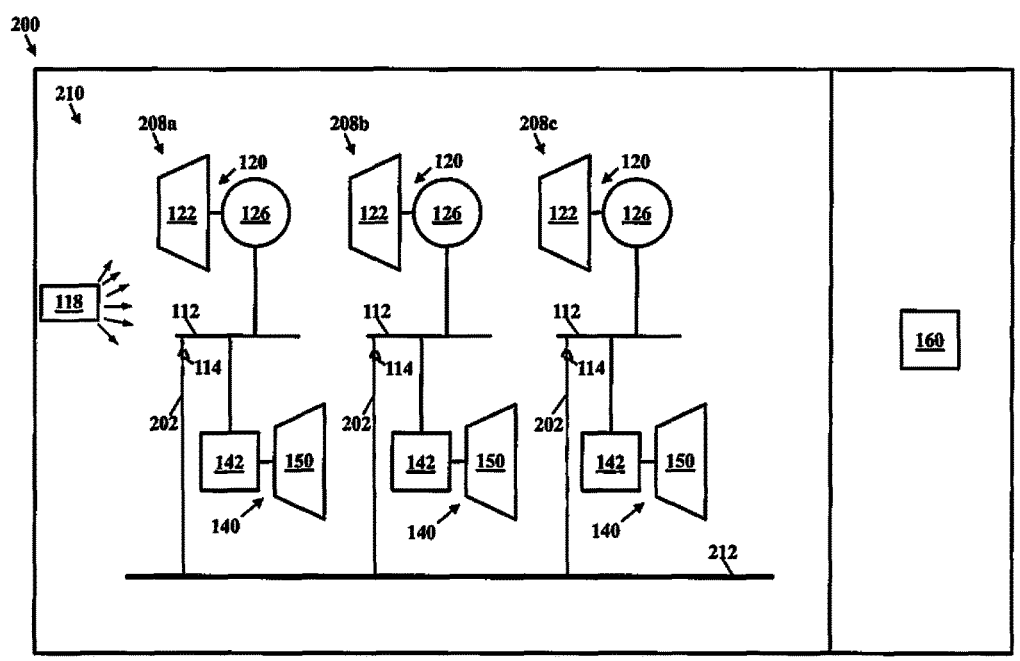
FIG. 2 depicts a schematic of an illustrative electrical power system that can include a plurality of liquefaction trains in separate or interconnected MDC power networks that can be electrically isolated from each other and from the BOP power network, according to one or more embodiments described.

In one or more embodiments, an electrical power network can include a motor driven compressor (MDC) power network electrically isolated from a balance of plant (BOP) power network. The MDC power network can be configured to generate and distribute MDC electrical power and the BOP power network can be configured to generate and distribute BOP electrical power. The MDC power network can include one or more MDC trains, and each of the MDC trains can include an MDC distribution bus, one or more MDC turbine generators, one or more electric motors, and one or more compressors. The one or more MDC turbine generators can be configured to generate the MDC electrical power. The MDC distribution bus can be configured to distribute the MDC electrical power and can be electrically connected to the one or more MDC turbine generators and the one or more electric motors. Each of the compressors can be coupled to an electric motor and can be configured to be driven by the electric motor. In certain embodiments, a single motor may drive more than one compressor. The BOP power network can include a BOP distribution bus, one or more BOP turbine generators, and one or more plant circuits. The one or more BOP turbine generators can be configured to generate the BOP electrical power. The BOP distribution bus can be configured to distribute the BOP electrical power and can be electrically connected to the one or more BOP turbine generators and the one or more plant circuits. The one or more plant circuits can be configured to be powered by the BOP electrical power.

FIG. 1 depicts a schematic of an illustrative electrical power system 100 that can include an MDC power network 110 electrically isolated and independent from a BOP power network 160, according to one or more embodiments. The electrical power system 100 can be in a liquefaction plant or facility, such as an all-electric liquefied natural gas (LNG) plant. The MDC power network 110 can include one or more liquefaction trains 108, such as one or more LNG trains. The MDC power network 110 can be configured to generate and distribute electricity (e.g., MDC electrical power) within each of the liquefaction trains 108. Electrically isolated and independent from the MDC power network 110, the BOP power network 160 can be configured to generate and distribute electricity (e.g., BOP electrical power) for running the balance of plant (BOP) which can include, for example, administration buildings and/or auxiliary process and non-process loads.

The MDC power network 110, as shown in FIG. 1, has a single liquefaction train 108, but in other embodiments, the MDC power network 110 can include multiple liquefaction trains 108 (not depicted), which can be configured to be electrically connected to each other or can be configured to be electrically isolated and independent from one another. Each of the liquefaction trains 108 can include an MDC distribution bus 112, one or more MDC turbine generators 120, and one or more refrigeration compressors 140. Each of the MDC turbine generators 120 and each of the refrigeration compressors 140 can be coupled to and electrically connected to the MDC distribution bus 112. The MDC distribution bus 112 can be configured to distribute electricity (e.g., MDC electrical power). For example, the one or more MDC turbine generators 120 can generate electricity, the MDC distribution bus 112 can receive and distribute the electricity, and the one or more refrigeration compressors 140 can be driven by the electricity. The MDC distribution bus 112 can be a single, double, ring, double-ended, or any other type of electrical bus configuration.

Each of the MDC turbine generators 120 can include one or more MDC turbines 122 and one or more MDC power generators 126. The MDC turbine 122 can be directly or indirectly coupled to the MDC power generator 126. The MDC power generator 126 can be coupled to and electrically connected to the MDC distribution bus 112. The MDC turbine 122 can be configured to generate rotational energy and the MDC power generator 126 can be configured to convert at least a portion of the rotational energy of the MDC turbine 122 into the MDC electrical power. In some embodiments, the MDC turbine generator 120 can include a shaft 124 coupled to the MDC turbine 122 and the MDC power generator 126. The shaft 124 can be configured to transfer at least a portion of the rotational energy of the MDC turbine 122 to the MDC power generator 126. Instead of the shaft 124, the MDC turbine 122 can be directly or indirectly coupled to the MDC power generator 126 by an axle, a transmission, one or more gears, a gearbox, a belt, or any combination thereof. Although not shown, the MDC turbine 122 can be fluidly coupled to and disposed between a high pressure side and a low pressure side of a working fluid circuit and configured to generate the rotational energy from a pressure drop in a working fluid within the working fluid circuit. The MDC turbine generator 120 can be a gas turbine generator, other combustion turbine generator, a steam turbine generator, or other type of generator.

In some embodiments, each of the liquefaction trains 108 can include two or more MDC turbine generators 120, such as about three, about four, about five, about six, about seven, about eight, about nine, about ten, about eleven, about twelve, about thirteen, about fourteen, about sixteen, about eighteen, about twenty, or more MDC turbine generators 120. Each of the liquefaction trains 108 can include two or more MDC turbines 122, such as about three, about four, about five, about six, about seven, about eight, about nine, about ten, about eleven, about twelve, about thirteen, about fourteen, about sixteen, about eighteen, about twenty, or more MDC turbines 122. Also, each of the liquefaction trains 108 can include two or more MDC power generators 126, such as about three, about four, about five, about six, about seven, about eight, about nine, about ten, about eleven, about twelve, about thirteen, about fourteen, about sixteen, about eighteen, about twenty, or more MDC power generators 126.

In some examples, the MDC turbine 122 can be a gas turbine designed with specific outputs. In one example, the MDC turbine 122 can be configured for a 50 Hz electric grid (frequency of about 50 Hz±about 5%) and can operate at about 3,000 rpm if the MDC power generator 126 is a 2-pole electric machine. In another example, the MDC turbine 122 can be configured for a 60 Hz electric grid (frequency of about 60 Hz±about 5%) and can operate at about 3,600 rpm if MDC generator 126 is 2-pole. In another example, the MDC generator 126 can be a direct-current (DC) machine, or can include a rectifier to create DC from an alliterating-current (AC) output, the MDC distribution bus 112 can be DC, and the MDC electric motor (142) can be DC.

Each of the refrigeration compressors 140 can include one or more electric motors 142 and one or more compressors 150. The electric motor 142 can be coupled to and electrically connected to the MDC distribution bus 112. The compressor 150 can be configured to be driven by the electric motor 142. The compressor 150 can be directly or indirectly coupled to the electric motor 142, such as by a shaft, an axle, a transmission, one or more gears, a gearbox, a belt, or any combination thereof. In one example, as depicted in FIG. 1, a shaft 144 can be coupled to and between the electric motor 142 and the compressor 150.

In some embodiments, each of the liquefaction trains 108 can include two or more refrigeration compressors 140, such as about three, about four, about five, about six, about seven, about eight, about nine, about ten, about eleven, about twelve, about thirteen, about fourteen, about sixteen, about eighteen, about twenty, or more refrigeration compressors 140. Each of the liquefaction trains 108 can include two or more electric motors 142, such as about three, about four, about five, about six, about seven, about eight, about nine, about ten, about eleven, about twelve, about thirteen, about fourteen, about sixteen, about eighteen, about twenty, or more electric motors 142. Also, each of the liquefaction trains 108 can include two or more compressors 150, such as about three, about four, about five, about six, about seven, about eight, about nine, about ten, about eleven, about twelve, about thirteen, about fourteen, about sixteen, about eighteen, about twenty, or more compressors 150.

In some embodiments, the electrical power system 100 can further include an MDC control system 118 operatively and/or communicably connected to the MDC power network 110. The MDC control system 118 can be or include one or more computers or controllers with one or more software packages for managing the MDC power network 110 including one or more of the liquefaction trains 108. The MDC control system 118 can be wired and/or wirelessly connected to the MDC power network 110 and can be configured to monitor and control various components and process operation parameters of the MDC power network 110. The MDC control system 118 can be operable to selectively adjust various components and/or process operation parameters in accordance with a control program or algorithm. Selectively adjusting various components and/or process operation parameters in accordance with a control program or algorithm can maximize operation of the MDC power network 110, as well as the overall electrical power system 100.

In one or more embodiments, a dry low $NO_x$ (DLN) controller 119 can be included in the MDC control system 118 (as depicted in FIG. 1) can be included in one or more of the MDC turbine generators 120 (not shown), or can be a standalone controller operatively and/or communicably connected to the MDC power network 110 (not shown). The DLN controller 119 can be configured to minimize the effects of combustion dynamics and/or reduce $NO_x$ emissions. The DLN controller 119 can manage one or more components and/or process operation parameters of the MDC turbine 122.

The DLN controller 119 can be utilized for combustion dynamics tuning which can include acquiring and analyzing dynamics data in real time or substantially in real time and adjusting the operating configuration of the MDC turbine generator 120. The DLN controller 119 can minimize greenhouse emissions, such as carbon dioxide and nitrogen oxides, as well as reduce combustion hardware stress levels. In some examples, the MDC turbine generator 120 can be a combustion turbine generator, and the MDC control system 118 can be operatively connected to the MDC turbine generator 120 and can be configured to tune the MDC turbine generator 120 with the DLN controller 119.

In one or more embodiments, a dry low $NO_x$ (DLN) controller 169 can be included in the BOP control system 168 (as depicted in FIG. 1) can be included in one or more of the BOP turbine generators 170 (not shown), or can be a standalone controller operatively and/or communicably connected to the BOP power network 160 (not shown).

In one or more embodiments, the MDC power network 110 can optionally include one or more switches 114 operatively coupled to and electrically connected to the MDC distribution bus 112. Each of the switches 114 can independently be or include one or more circuit breakers, safety switches, disconnect switches, fuses, control switches, switchgears (e.g., train switchgears or other de-energizing devices), controllers, or other control devices. Each switch 114 can be configured to electrically connect, isolate, control, and/or protect any of the electrical components configured to be electrically connected with the MDC distribution bus 112. The switches 114 can be digital or analog, automated or manual, and locally or remotely controlled or operated, such as, for example, by an MDC control system 118. The switches 114 can include two-way switches, three-way switches, or other multi-way switches. In one example, a switch 114 can be operatively disposed between the MDC power generator 126 and the MDC distribution bus 112. In another example, a switch 114 can be operatively disposed between the electric motor 142 and the MDC distribution bus 112.

In one or more embodiments, the MDC power network 110 can optionally include one or more motor soft starters or adjustable speed drives (ASDs) 130, as depicted by phantom in FIG. 1. The ASD 130 can be coupled to and electrically connected to the MDC distribution bus 112 and each of the electric motors 142. The ASD 130 can be operatively coupled to the electric motor 142 and can be configured to control at least the speed of the electric motor 142, which in turn can control the compressor 150 output. The compressor 150 can be configured to be driven by the electric motor 142 via the ASD 130. The ASD 130 can be or include one or more motor soft starters, variable frequency drives (VFD), variable speed drives (VSD), variable speed drive systems (VSDS), adjustable frequency drives (AFD), direct-current (DC) drives, or any combination thereof. A switch 114 can be operatively disposed between the ASD 130 and the MDC distribution bus 112. In some examples, each ASD 130 can be configured to power and drive an individual electric motor 142 driving a separate compressor 150. Therefore, each of the liquefaction trains 108 can include two or more ASDs 130, such as about three, about four, about five, about six, about seven, about eight, about nine, about ten, about eleven, about twelve, about thirteen, about fourteen, about sixteen, about eighteen, about twenty, or more ASDs 130. In some examples, the MDC power network 110 can include a single set one ASD 130 driving one electric motor 142 driving one compressor 150 and an optional switch 114. In other examples, the MDC power network 110 can include two, three, four, five, six, seven, eight, nine, ten, eleven, twelve, thirteen, fourteen, sixteen, eighteen, twenty, or more sets of one ASD 130 driving one electric motor 142 driving one compressor 150 and one optional switch 114. In other examples, each set of the ASD 130, the electric motor 142, and the compressor 150 can include two or more of the ASDs 130, the electric motors 142, the compressors 150, and/or the switches 114.

In another embodiment, each ASD 130 may drive multiple motors 142 and/or each motor 142 may drive multiple compressors 150.

In another embodiment, the MDC power network 110 can optionally include one or more bypass connections 134 coupled to and electrically connected to the MDC distribution bus 112, as depicted by phantom in FIG. 1. In some examples, one end of the bypass connection 134 can be coupled to and electrically connected to the MDC distribution bus 112 and the other end can be coupled to and electrically connected to the electrical connection (e.g., a portion of the MDC distribution bus 112) between the adjustable speed drive 130 and the electric motor 142. In other examples, one end of the bypass connection 134 can be coupled to and electrically connected to the MDC distribution bus 112 and the other end can be coupled to and electrically connected to the adjustable speed drive 130 and/or the electric motor 142. The bypass connection 134 can be operatively connected to the adjustable speed drive 130 and/or the electric motor 142. The bypass connection 134 can be used to bypass or otherwise avoid the adjustable speed drive 130. In one or more embodiments, the compressor 150 can be configured to be driven by the electric motor 142 via direct on-line starting, the ASD 130, or a motor soft starter. A switch 114 can be operatively coupled to and electrically connected to the bypass connection 134. In some examples, the switch 114 (e.g., circuit breaker) can be operatively disposed on the bypass connection 134 between the MDC distribution bus 112 and the ASD 130. In other examples, the switch 114 can be operatively disposed on the bypass connection 134 between the MDC distribution bus 112 and the electric motor 142. In other examples, the switch 114 can be operatively disposed on the bypass connection 134 between the MDC distribution bus 112 and an electrical connection between the adjustable speed drive 130 and the electric motor 142.

The MDC power network 110 can optionally include one or more harmonic filters 138 coupled to and electrically connected to the MDC distribution bus 112. In some examples, the harmonic filter 138 can be directly connected to the MDC distribution bus 112. In other examples, the harmonic filter 138 can be indirectly connected to the MDC distribution bus 112, such as connected through one or more transformers (not shown). In other examples, the harmonic filter 138 can be connected through tertiary windings of the input transformers on the ASD 130. The harmonic filter 138 can be configured to separate, reduce, dampen, or otherwise cancel harmonic waves generated by components of the electrical power system 100, such as the ASD 130 within the MDC power network 110. For example, by applying two electrically isolated and independent electric power systems within an LNG plant, such as the MDC power network 110 and the BOP power network 160 within the electrical power system 100, harmonics that are generated by the non-linear loads of any ASD 130 connected to the MDC power network 110 can be isolated from the non-harmonic loads connected to the BOP power network 160. As such, one or more harmonic filters 138 can be utilized on the MDC power network 110 depending on the capability of the ASDs 130 connected to the MDC power network 110. In some examples, an optional switch 114 (e.g., circuit breaker) can be operatively disposed between the harmonic filter 138 and the MDC distribution bus 112, as depicted in FIG. 1.

The electrical power system 100 can be utilized in a liquefaction plant or facility for liquefying or otherwise processing one or more types of process fluids, depending on the type of plant. In some embodiments, the compressor 150 can be fluidly coupled to one or more process fluid lines 152. The compressor 150 can be configured to compress or pressurize a process fluid, and/or pump, push, or otherwise move the process fluid within the process fluid line 152. The process fluid can include one or more gases, liquefied gases, compressed or pressurized gases, liquids, supercritical fluids, subcritical fluids, suspensions, solutions, emulsions, or any mixture thereof. In some embodiments, the process fluid can be or include one or more of hydrocarbons, carbon monoxide, carbon dioxide, hydrogen, nitrogen, nitrous oxide, water, or any mixture thereof. Illustrative hydrocarbons can include, but are not limited to, methane, ethane, propane, butane, ethylene, propylene, ethyne, butadiene, or any mixture thereof. In one or more embodiments, the process fluid can be or include natural gas, syngas, carbon monoxide, carbon dioxide, hydrogen, nitrogen, nitrous oxide, or any mixture thereof. In some examples, the compressor 150 can be configured for hydrocarbon compression service. For example, the process fluid can be a refrigerant and/or include LNG and the electrical power system 100 can be disposed in an all-electric LNG plant.

In one or more embodiments, the MDC power network 110 can optionally include one or more power blocks 148 coupled to and configured to be electrically connected to the MDC distribution bus 112. In some examples, an optional switch 114 (e.g., circuit breaker) can be operatively disposed between the power block 148 and the MDC distribution bus 112, as depicted in FIG. 1. Each of the power blocks 148 can be an electrically isolated and independent liquefaction train 108. In some embodiments, the MDC power network 110 can include two or more liquefaction trains 108, such as about three, about four, about five, about six, about seven, about eight, about nine, about ten, about eleven, about twelve, about thirteen, about fourteen, about fifteen, about sixteen, about seventeen, about eighteen, about nineteen, about twenty, about twenty five, about thirty, or more liquefaction trains 108. In some examples, the MDC power network 110 can include two liquefaction trains 108 to about thirty liquefaction trains 108, two liquefaction trains 108 to about twenty liquefaction trains 108, two liquefaction trains 108 to about twelve liquefaction trains 108, two liquefaction trains 108 to about ten liquefaction trains 108, two liquefaction trains 108 to about eight liquefaction trains 108, two liquefaction trains 108 to about six liquefaction trains 108, or two liquefaction trains 108 to about four liquefaction trains 108.

FIG. 1 also depicts the BOP power network 160 that can include one or more BOP turbine generators 170, a BOP distribution bus 162, and one or more plant circuits 180, 182, 184. Each of the BOP turbine generators 170 and each of the plant circuits 180, 182, 184 can be coupled to and electrically connected to the BOP distribution bus 162. The BOP distribution bus 162 can be configured to distribute electricity (e.g., BOP electrical power) from the BOP turbine generators 170 to the plant circuits 180, 182, 184. For example, the one or more BOP turbine generators 170 can generate electricity, the BOP distribution bus 162 can receive the electricity from the BOP turbine generators 170 and distribute the electricity to the plant circuits 180, 182, 184, and the plant circuits 180, 182, 184 are powered by the electricity. The plant circuits 180, 182, 184, collectively, make up the BOP electrical loads which can include, for example, secondary production lines, administration buildings, and/or various process non-process auxiliary loads. In one embodiment, one or more additional feeder connections can be disposed to supply BOP electrical loads, such as coupled to and electrically connected to one or more of the plant circuits 180, 182, 184 (not shown).

Each of the BOP turbine generators 170 can include one or more BOP turbines 172 and one or more BOP power generators 176. The BOP turbine 172 can be directly or indirectly coupled to the BOP power generator 176. The BOP power generator 176 can be coupled to and electrically connected to the BOP distribution bus 162. The BOP turbine 172 can be configured to generate rotational energy and the BOP power generator 176 can be configured to convert at least a portion of the rotational energy of the BOP turbine 172 into the MDC electrical power. In some embodiments, the BOP turbine generator 170 can include a shaft 174 coupled to the BOP turbine 172 and the BOP power generator 176. The shaft 174 can be configured to transfer at least a portion of the rotational energy of the BOP turbine 172 to the BOP power generator 176. Instead of the shaft 174, the BOP turbine 172 can be directly or indirectly coupled to the BOP power generator 176 by an axle, a transmission, one or more gears, a gearbox, a belt, or any combination thereof. Although not shown, the BOP turbine 172 can be fluidly coupled to and disposed between a high pressure side and a low pressure side of a working fluid circuit and configured to generate the rotational energy from a pressure drop in a working fluid within the working fluid circuit. The BOP turbine generator 170 can be a gas turbine generator, a combustion turbine generator, a steam turbine generator, or other type of generator.

In some embodiments, the BOP power network 160 can include two or more BOP turbine generators 170, such as about three, about four, about five, about six, about seven, about eight, about nine, about ten, about eleven, about twelve, about thirteen, about fourteen, about sixteen, about eighteen, about twenty, or more BOP turbine generators 170. The BOP power network 160 can include two or more BOP turbines 172, such as about three, about four, about five, about six, about seven, about eight, about nine, about ten, about eleven, about twelve, about thirteen, about fourteen, about sixteen, about eighteen, about twenty, or more BOP turbines 172. Also, the BOP power network 160 can include two or more BOP power generators 176, such as about three, about four, about five, about six, about seven, about eight, about nine, about ten, about eleven, about twelve, about thirteen, about fourteen, about sixteen, about eighteen, about twenty, or more BOP power generators 176.

In some examples, the BOP turbine 172 can be a gas turbine designed with specific outputs. In one example, the BOP turbine 172 can be configured for a 50 Hz electric grid (frequency of about 50 Hz±about 5%) and can operate at about 3,000 rpm. In another example, the BOP turbine 172 can be configured for a 60 Hz electric grid (frequency of about 60 Hz±about 5%) and can operate at about 3,600 rpm. In one or more embodiments, the output of the BOP turbine 172 can be different from the output of the MDC turbine 122. In one or more examples, the electrical frequency of the BOP power network 160 can be the same as, or different than, the electrical frequency of the MDC power network 110. In some examples, the MDC frequency can be about 50 Hz and the BOP frequency can be about 60 Hz. In other examples, the MDC frequency can be about 60 Hz and the BOP frequency can be about 50 Hz. In other examples, the MDC frequency and the BOP frequency can be the same or substantially the same, but independent of each other, such as about 50 Hz or about 60 Hz. In all embodiments, the MDC electrical power may be any voltage and the BOP electrical power may be any voltage. The MDC electrical voltage can be the same as, or different than, the BOP electrical voltage.

In some embodiments, the electrical power system 100 can further include a BOP control system 168 operatively and/or communicably connected to the BOP power network 160. The BOP control system 168 can be or include one or more computers or controllers one or more software packages for managing the BOP power network 160. The BOP control system 168 can be wired and/or wirelessly connected to the BOP power network 160 and can be configured to monitor and control various components and process operation parameters of the BOP power network 160. The BOP control system 168 can be operable to selectively adjust various components and process operation parameters in accordance with a control program or algorithm can maximize operation of the BOP power network 160, as well as the electrical power system 100.

In one or more embodiments, the BOP power network 160 can optionally include one or more switches 164 coupled to and electrically connected to the BOP distribution bus 162. Each of the switches 164 can independently be or include one or more circuit breakers, safety switches, disconnect switches, fuses, control switches, switchgears (e.g., train switchgears or other de-energizing devices), controllers, or other control devices. Each switch 164 can be configured to electrically connect, isolate, control, and/or protect any of the electrical components configured to be electrically connected with the BOP distribution bus 162. The switches 164 can be digital or analog, automated or manual, and locally or remotely controlled or operated, such as, for example, by a BOP control system 168. The switches 164 can include two-way switches, three-way switches, or other multi-way switches. In one example, a switch 164 can be disposed between the BOP power generator 176 and the BOP distribution bus 162. In another example, one or more switches 164 can be disposed between each of the one or more plant circuits 180, 182, 184 and the BOP distribution bus 162.

In one or more embodiments, the BOP power network 160 can optionally be coupled to and configured to be electrically connected to an electrical grid 198 of a local power utility. In some examples, an optional switch 164 (e.g., circuit breaker) can be disposed between the electrical grid 198 and the BOP distribution bus 162, as depicted in FIG. 1. The electrical grid 198 can be used to fulfill electricity demands for the BOP electrical loads drawn by the BOP power network 160, namely the one or more plant circuits 180, 182, 184.

In one or more embodiments, the total operating load capacity of the electrical power system 100 is the sum of the operating load capacity of the MDC power network 110 and the operating load capacity of the BOP power network 160. The MDC power network 110 and the BOP power network 160, together, can have a total operating load capacity of the electrical power system 100 that can be less than 1,000 MW, less than 950 MW, less than 900 MW, less than 850 MW, less than 800 MW, less than 750 MW, less than 700 MW, less than 650 MW, less than 600 MW, less than 550 MW, less than 500 MW, less than 450 MW, less than 400 MW, less than 350 MW, less than 300 MW, less than 250 MW, less than 200 MW, less than 150 MW, less than 100 MW, or less than 50 MW. In one or more embodiments, the total operating load capacity of the electrical power system 100 can be about 50 MW or greater, about 100 MW or greater, about 150 MW or greater, about 200 MW or greater, about 250 MW or greater, about 300 MW or greater, about 350 MW or greater, about 400 MW or greater, about 450 MW or greater, about 500 MW or greater, about 550 MW or greater, about 600 MW or greater, about 650 MW or greater, about 700 MW or greater, about 750 MW or greater, about 800 MW or greater, about 850 MW or greater, about 900 MW or greater, about 950 MW or greater, or about 1,000 MW or greater.

In one or more embodiments, the electrical power system 100 can have a total operating load capacity of about 400 MW to about 750 MW and a total $NO_x$ emissions of less than 1,000 pounds per hour (pph), less than 950 pph, less than 900 pph, less than 850 pph, less than 800 pph, less than 750 pph, less than 700 pph, less than 650 pph, less than 600 pph, less than 550 pph, less than 500 pph, less than 450 pph, less than 400 pph, less than 350 pph, or less than 300 pph. In other examples, the electrical power system 100 can have a total operating load capacity of about 775 MW to about 1,000 MW and a total $NO_x$ emissions of less than 1,000 pounds per hour (pph), less than 950 pph, less than 900 pph, less than 850 pph, less than 800 pph, less than 750 pph, less than 700 pph, less than 650 pph, less than 600 pph, less than 550 pph, less than 500 pph, less than 450 pph, less than 400 pph, less than 350 pph, or less than 300 pph. In other examples, the electrical power system 100 can have a total operating load capacity of about 200 MW to about 425 MW and a total $NO_x$ emissions of less than 1,000 pph, less than 950 pph, less than 900 pph, less than 850 pph, less than 800 pph, less than 750 pph, less than 700 pph, less than 650 pph, less than 600 pph, less than 550 pph, less than 500 pph, less than 450 pph, less than 400 pph, less than 350 pph, or less than 300 pph. In one or more embodiments, the electrical power system 100 can have a total operating load capacity of about 50 MW, about 100 MW, about 150 MW, about 200 MW, about 250 MW, about 300 MW, about 350 MW, about 400 MW, about 450 MW, about 500 MW, about 550 MW, about 600 MW, about 650 MW, about 700 MW, about 750 MW, about 800 MW, about 850 MW, about 900 MW, about 950 MW, or about 1,000 MW and a total $NO_x$ emissions of less than 1,000 pph, less than 950 pph, less than 900 pph, less than 850 pph, less than 800 pph, less than 750 pph, less than 700 pph, less than 650 pph, less than 600 pph, less than 550 pph, less than 500 pph, less than 450 pph, less than 400 pph, less than 350 pph, or less than 300 pph.

In one or more embodiments, the MDC power network 110 can have an operating load capacity of about 100 MW, about 250 MW, about 500 MW, about 750 MW, or about 1,000 MW to about 1,250 MW, about 1,500 MW, about 1,750 MW, or about 2,000 MW and the BOP power network 160 can have an operating load capacity of about 5 MW, about 10 MW, about 15 MW, about 20 MW, or about 25 MW to about 50 MW, about 60 MW, about 70 MW, about 80 MW, about 90 MW, or about 100 MW. For example, the MDC power network 110 can have an operating load capacity of about 100 MW to about 2,000 MW and the BOP power network 160 can have an operating load capacity of about 5 MW to about 100 MW. For example, the MDC power network 110 can have an operating load capacity of about 200 MW to about 800 MW and the BOP power network 160 can have an operating load capacity of about 40 MW to about 80 MW.

In one or more embodiments, the MDC power network 110 can have an operating load capacity of about 50 MW, about 75 MW, about 100 MW, about 150 MW, about 200 MW, about 250 MW, about 300 MW, about 350 MW, about 400 MW, or about 450 MW to about 600 MW, about 650 MW, about 700 MW, about 750 MW, about 800 MW, about 900 MW, about 1,000 MW, about 1,200 MW, or about 1,400 MW and the BOP power network 160 can have an operating load capacity of about 1 MW, about 5 MW, about 10 MW, about 15 MW, or about 20 MW to about 50 MW, about 75 MW, about 100 MW, about 200 MW, about 250 MW, about 300 MW, about 350 MW, about 400 MW, about 450 MW, about 600 MW, about 650 MW, about 700 MW, about 750 MW, about 800 MW, about 900 MW, about 1,000 MW, about 1,200 MW, or about 1,400 MW.

In one or more embodiments, the electrical power system 100 can have a total $NO_x$ emissions of about 50 pph to about 1,500 pph and a total $CO_2$ emissions of less than 750,000 pph. For example, the electrical power system 100 can have a total $NO_x$ emissions of less than 1,500 pph and a total $CO_2$ emissions of less than 750,000 pph. In another example, the electrical power system 100 can have a total $NO_x$ emissions of less than 1,500 pph, less than 1,400 pph, less than 1,300 pph, less than 1,200 pph, less than 1,100 pph, less than 1,000 pph, less than 900 pph, less than 800 pph, less than 700 pph, less than 600 pph, less than 500 pph, less than 400 pph, less than 300 pph, less than 300 pph, less than 100 pph, or less than 50 pph and a total $CO_2$ emissions of less than 750,000 pph, less than 725,000 pph, less than 710,000 pph, less than 700,000 pph, less than 675,000 pph, less than 650,000 pph, less than 600,000 pph, less than 550,000 pph, less than 500,000 pph, less than 450,000 pph, or less than 400,000 pph.

In one or more embodiments, the MDC power network 110 can have an operating load capacity of about 50 MW, about 75 MW, about 100 MW, about 150 MW, about 200 MW, about 250 MW, about 300 MW, about 350 MW, about 400 MW, or about 450 MW to about 600 MW, about 650 MW, about 700 MW, about 750 MW, about 800 MW, about 900 MW, about 1,000 MW, about 1,200 MW, or about 1,400 MW, the BOP power network 160 can have an operating load capacity of about 1 MW, about 5 MW, about 10 MW, about 15 MW, or about 20 MW to about 50 MW, about 75 MW, about 100 MW, about 200 MW, about 250 MW, about 300 MW, about 350 MW, about 400 MW, about 450 MW, about 600 MW, about 650 MW, about 700 MW, about 750 MW, about 800 MW, about 900 MW, about 1,000 MW, about 1,200 MW, or about 1,400 MW, and the electrical power system 100 can have a total $NO_x$ emissions of less than 1,500 pph, less than 1,400 pph, less than 1,300 pph, less than 1,200 pph, less than 1,100 pph, less than 1,000 pph, less than 900 pph, less than 800 pph, less than 700 pph, less than 600 pph, less than 500 pph, less than 400 pph, less than 300 pph, less than 300 pph, less than 100 pph, or less than 50 pph and a total $CO_2$ emissions of less than 750,000 pph, less than 725,000 pph, less than 710,000 pph, less than 700,000 pph, less than 675,000 pph, less than 650,000 pph, less than 600,000 pph, less than 550,000 pph, less than 500,000 pph, less than 450,000 pph, or less than 400,000 pph.

The electrical power system 100 can have a $NO_x$ emissions operating load ratio that can be equal to the total $NO_x$ emissions (e.g., sum of the $NO_x$ emissions from the MDC and BOP power networks 110, 160) per the total operating load (e.g., sum of the operating load capacities of the MDC and BOP power networks 110, 160). In one or more embodiments, the electrical power system 100 can have a $NO_x$ emissions operating load ratio of less than 10 pph/MW, less than 9 pph/MW, less than 8 pph/Mw, less than 7 pph/MW, less than 6.53 pph/MW, less than 6.5 pph/MW, less than 6 pph/MW, less than 5.5 pph/MW, less than 5 pph/MW, less than 4.5 pph/MW, less than 4 pph/MW, less than 3.5 pph/MW, less than 3 pph/MW, less than 2.5 pph/MW, less than 2 pph/MW, less than 1.5 pph/MW, less than 1 pph/MW, less than 0.9 pph/MW, less than 0.8 pph/MW, less than 0.7 pph/MW, less than 0.6 pph/MW, less than 0.5 pph/MW, less than 0.4 pph/MW, less than 0.3 pph/MW, less than 0.2 pph/MW, less than 0.1 pph/MW, less than 0.09 pph/MW, less than 0.08 pph/MW, less than 0.07 pph/MW, less than 0.06 pph/MW, less than 0.05 pph/MW, or less than 0.01 pph/MW.

In one or more embodiments, the $NO_x$ emissions operating load ratio of the electrical power system 100 can be less than 6.53 pph/MW, about 6.5 pph/MW or less, about 6 pph/MW or less, about 5.5 pph/MW or less, about 5 pph/MW or less, about 4.5 pph/MW or less, about 4 pph/MW or less, about 3.5 pph/MW or less, about 3 pph/MW or less, about 2.5 pph/MW or less, about 2 pph/MW or less, about 1.5 pph/MW or less, about 1 pph/MW or less, about 0.9 pph/MW or less, about 0.8 pph/MW or less, about 0.7 pph/MW or less, about 0.6 pph/MW or less, about 0.5 pph/MW or less, about 0.4 pph/MW or less, about 0.3 pph/MW or less, about 0.2 pph/MW or less, about 0.1 pph/MW or less, about 0.09 pph/MW or less, about 0.08 pph/MW or less, about 0.07 pph/MW or less, about 0.06 pph/MW or less, about 0.05 pph/MW or less, or about 0.01 pph/MW or less.

In one or more embodiments, the MDC power network 110 can have an operating load capacity of about 50 MW, about 75 MW, about 100 MW, about 150 MW, about 200 MW, about 250 MW, about 300 MW, about 350 MW, about 400 MW, or about 450 MW to about 600 MW, about 650 MW, about 700 MW, about 750 MW, about 800 MW, about 900 MW, about 1,000 MW, about 1,200 MW, or about 1,400 MW, the BOP power network 160 can have an operating load capacity of about 1 MW, about 5 MW, about 10 MW, about 15 MW, or about 20 MW to about 50 MW, about 75 MW, about 100 MW, about 200 MW, about 250 MW, about 300 MW, about 350 MW, about 400 MW, about 450 MW, about 600 MW, about 650 MW, about 700 MW, about 750 MW, about 800 MW, about 900 MW, about 1,000 MW, about 1,200 MW, or about 1,400 MW, the electrical power system 100 can have a total $NO_x$ emissions of less than 1,500 pph, less than 1,400 pph, less than 1,300 pph, less than 1,200 pph, less than 1,100 pph, less than 1,000 pph, less than 900 pph, less than 800 pph, less than 700 pph, less than 600 pph, less than 500 pph, less than 400 pph, less than 300 pph, less than 300 pph, less than 100 pph, or less than 50 pph and a total $CO_2$ emissions of less than 750,000 pph, less than 725,000 pph, less than 710,000 pph, less than 700,000 pph, less than 675,000 pph, less than 650,000 pph, less than 600,000 pph, less than 550,000 pph, less than 500,000 pph, less than 450,000 pph, or less than 400,000 pph, and the $NO_x$ emissions operating load ratio of the electrical power system 100 can be less than 6.53 pph/MW, about 6.5 pph/MW or less, about 6 pph/MW or less, about 5.5 pph/MW or less, about 5 pph/MW or less, about 4.5 pph/MW or less, about 4 pph/MW or less, about 3.5 pph/MW or less, about 3 pph/MW or less, about 2.5 pph/MW or less, about 2 pph/MW or less, about 1.5 pph/MW or less, about 1 pph/MW or less, about 0.9 pph/MW or less, about 0.8 pph/MW or less, about 0.7 pph/MW or less, about 0.6 pph/MW or less, about 0.5 pph/MW or less, about 0.4 pph/MW or less, about 0.3 pph/MW or less, about 0.2 pph/MW or less, about 0.1 pph/MW or less, about 0.09 pph/MW or less, about 0.08 pph/MW or less, about 0.07 pph/MW or less, about 0.06 pph/MW or less, about 0.05 pph/MW or less, or about 0.01 pph/MW or less.

In one or more embodiments, the MDC power network 110 and the BOP power network 160 of the electrical power system 100 can be electrically isolated and/or independent from each other, can have different electrical AC frequencies (e.g., one frequency can be about 5 Hz to about 15 Hz greater than the other frequency or about 10 Hz greater than the other frequency), one or both can be DC, and the MDC power network 110 and the BOP power network 160, together, can have a total operating load capacity of less than 1,000 MW. The MDC control system 118 can be operatively connected to and configured to monitor and control process operation parameters of the MDC power network 110, the MDC control system 118 can be operatively connected to and configured to tune the MDC turbine generator 120 with the DLN controller 119. The DLN controller 119 can be configured to maintain a total $NO_x$ emissions of less than 1,500 pph in order to minimize the effects of combustion dynamics.

In one or more embodiments, a method for generating electricity can include generating MDC electrical power and BOP electrical power in an electrical power system 100, such that the MDC electrical power and the BOP electrical power have different electrical AC frequencies (e.g., one frequency can be about 5 Hz to about 15 Hz greater than the other frequency or about 10 Hz greater than the other frequency), or one or both can be DC. The electrical power system 100 can include the MDC power network 110 configured to generate and distribute the MDC electrical power and the BOP power network 160 configured to generate and distribute the BOP electrical power. The method can also include compressing or moving a process fluid with the compressor 150, such that the compressor 150 can be driven by the electric motor 142 powered by the MDC electrical power, and powering at least one auxiliary device by the BOP electrical power. The method can also include tuning or otherwise adjusting one or more MDC turbine generators 120 with the DLN controller 119 to maintain a $NO_x$ emissions operating load ratio of less than 10.00 pph/MW, where the MDC turbine generators 120 can be powered by the MDC electrical power and the $NO_x$ emissions operating load ratio can be equal to a total sum of $NO_x$ emissions from the MDC 110 and BOP 160 power networks, per a total sum of operating load capacities from the MDC 110 and BOP 160 power networks.

FIG. 2 depicts a schematic of an illustrative electrical power system 200 that can include a plurality of liquefaction trains 208a-208c disposed in an MDC power network 210 that can be electrically isolated and independent of a BOP power network 160, according to one or more embodiments.

In one embodiment, the electrical power system 200 can include one or more MDC distribution buses 112, one or more MDC turbine generators 120, one or more refrigeration compressors 140, the MDC control system 118, and the BOP power network 160, as discussed and described above with reference to the electrical power system 100.

The electrical power system 200 or portions thereof depicted in FIG. 2 and the electrical power system 100 or portions thereof depicted in FIG. 1 share many common components. It should be noted that like numerals shown in the Figures and discussed herein represent like components throughout the multiple embodiments disclosed herein. Another embodiment can include a plurality of liquefaction trains in interconnected MDC power networks that can be electrically isolated from each other and from the BOP power network.

The MDC power network 210, as shown in FIG. 2, has a single synchronizing bus 212, but in other embodiments, the MDC power network 210 can include multiple synchronizing buses 212 (not depicted), which can be configured to be electrically connected to each other or can be configured to be electrically isolated and independent. The synchronizing bus 212 can be configured to be independently coupled to and electrically connected to each of the liquefaction trains 208a-208c. The synchronizing bus 212, as shown in FIG. 2, is coupled to and electrically connected to three liquefaction trains (e.g., liquefaction trains 208a-208c), but in other embodiments, the synchronizing bus 212 can be coupled to and electrically connected to one, two, three, four, five, six, seven, eight, nine, ten, eleven, twelve, thirteen, fourteen, sixteen, eighteen, twenty, or more liquefaction trains.

In one or more embodiments, each of the liquefaction trains 208a-208c can include one or more connections 202 coupled to and between each of the MDC distribution buses 112 and the synchronizing bus 212, as depicted in FIG. 2. Each of the connections 202 can be configured to be electrically connected to each of the MDC distribution buses 112 and the synchronizing bus 212. One or more switches 114 (e.g., switchgears) can be operatively coupled to each of the connections 202 and disposed between the MDC distribution bus 112 and the synchronizing bus 212.

In other embodiments, the connection 202 can also be coupled to and electrically connected to the synchronizing bus 212 and one or more other components in the liquefaction trains 208a-208c other than the MDC distribution bus 112 (not shown). For example, the connections 202 can be directly or indirectly coupled to and electrically connected to the synchronizing bus 212 and one or more of the MDC power generators 126, one or more of the electric motors 142, one or more of the ASDs 130 (as shown in FIG. 1), and/or one or more of the bypass connections 134 (as shown in FIG. 1).

In some embodiments, the switches 114 can be or include one or more switchgears operatively coupled between and electrically connected to the synchronizing bus 212 and each of the liquefaction trains 208a-208c. Each of the switches 114 can be associated and control the electrical connection to the respective liquefaction train 208a, 208b, or 208c. Therefore, in one embodiment, any one of the MDC turbine generators 120 can be configured to provide electricity (e.g., MDC electrical power) to any one or combinations of the liquefaction trains 208a-208c via the synchronizing bus 212, the connections 202, and the switches 114. In another embodiment, each of the liquefaction trains 208a-208c can have two or more MDC power generators 126, one of the two MDC power generators 126 can be used as a spare generator. The spare generator can be used to power one or more of the liquefaction trains 208a-208c by a closed transition without dropping power.

Experimental Section

PROPHETIC EXAMPLE

In one prophetic example, as outlined in Table 1, an electrical power system for a three-train LNG plant (e.g., electrical power system 200) was shown to be about 4% more fuel efficient than a conventional all-electric system. The electrical power system was shown to provide about 4% lower carbon dioxide emissions than a conventional all-electric system. The electrical power system was shown to provide about 85% lower nitrogen oxides ($NO_x$) emissions than a conventional all-electric system.

These results can be attributed to, in part, the total capacity of the MDC gas turbine generators 120 operating at maximum load or substantially near maximum load. The reduced nitrogen oxides ($NO_x$) emissions can be attributed to, in part, the total capacity of the MDC turbine generators (e.g., gas turbines) operating on DLN control.

TABLE 1

| | | Conventional All Electric Network | Network with Isolated MDC power network |
|---|---|---|---|
| Configurations | | | |
| Refrig Drivers | | (motors) | 6x 7EAs |
| Elec Power Generators | | 8x 7EAs | 7x Mars 100 |
| Operating Loads | | | |
| Refrig Drivers | | (motors) 6x 100% | 6x 85 MW 6x 100% |
| Elec Power Generators | | 8x 71.25 MW 8x 84% | 7x 8.6 MW 7x 86% |
| Total Power Generation | | 570 | 570 |
| Heat Rates and Fuel | LHV | | |
| Refrig Drivers | | | |
| Heat Rate | BTU/kWh | n/a | 10,430 |
| Fuel Consumption | MMBTU/h per GT | n/a | 887 |
| Elec Power Generators | | | |
| Heat Rate | BTU/kWh | 10,952 | 11,402 |
| Fuel Consumption | MMBTU/h per GT | 780 | 98 |
| Total Fuel Consumption | MMBTU/h | 6,242 | 6,006 |
| Emissions | | | |
| 7EA Combustor Type | | Standard (non-DLN) | DLN |
| 7EA $NO_x$ emissions | ppmvd@15% $O_2$ | 164 | 9 |
| | pph per GT | 465 | 29 |
| 7 EA $CO_2$ emissions | pph per GT | 90,919 | 103,300 |
| Mars Combustor Type | | n/a | Standard (non-DLN) |
| Mars $NO_x$ emissions | ppmvd @15% $O_2$ | n/a | 140 |
| | pph per GT | n/a | 50 |
| Mars $CO_2$ emissions | pph per GT | n/a | 11,422 |
| Total $NO_x$ emissions | pph | 3,721 | 523 |
| Total $CO_2$ emissions | pph | 727,354 | 699,751 |

Embodiments of the present disclosure further relate to any one or more of the following examples:

Example 1

An electrical power system, comprising: one or more motor driven compressor power networks, each powering a single motor driven compressor train and configured to generate and distribute motor driven compressor electrical power, wherein each motor driven compressor train comprises: one or more motor driven compressor turbine generators configured to generate the motor driven compressor electrical power motor driven compressor distribution bus electrically connected to the motor driven compressor turbine generator and configured to distribute the motor driven compressor electrical power; the electric motor electrically connected to the motor driven compressor distribution bus; and the motor driven compressor coupled to the electric motor and configured to be driven by the electric motor; and a balance of plant power network configured to generate and distribute balance of plant electrical power, wherein the balance of plant power network comprises: a balance of plant turbine generator configured to generate the balance of plant electrical power; a balance of plant distribution bus electrically connected to the balance of plant turbine generator and configured to distribute the balance of plant electrical power; and one or more plant circuits electrically connected to the balance of plant distribution bus and configured to be powered by the balance of plant electrical power, wherein the motor driven compressor power network and the balance of plant power network are electrically isolated from each other.

Example 2

The electrical power system of example 1, wherein the electrical power system has a total operating load capacity of about 400 MW to about 750 MW and a total $NO_x$ emissions of less than 1,000 pounds per hour.

Example 3

The electrical power system of example 1 or 2, wherein the electrical power system has a total $NO_x$ emissions of about 50 pounds per hour to about 1,500 pounds per hour and a total CO2 emissions of less than 750,000 pounds per hour.

Example 4

The electrical power system of any one of examples 1 to 3, wherein the electrical power system has a $NO_x$ emissions operating load ratio of less than 10.0 pounds per hour per MW.

Example 5

The electrical power system of any one of examples 1 to 3, wherein the electrical power system has a $NO_x$ emissions operating load ratio of less than 6.53 pounds per hour per MW.

Example 6

The electrical power system of any one of examples 1 to 3, wherein the electrical power system has a $NO_x$ emissions operating load ratio of less than 6.5 pounds per hour per MW.

Example 7

The electrical power system of any one of examples 1 to 3, wherein the electrical power system has a $NO_x$ emissions operating load ratio of less than 6 pounds per hour per MW.

Example 8

The electrical power system of any one of examples 1 to 3, wherein the electrical power system has a $NO_x$ emissions operating load ratio of less than 5 pounds per hour per MW.

Example 9

The electrical power system of any one of examples 1 to 3, wherein the electrical power system has a $NO_x$ emissions operating load ratio of less than 4 pounds per hour per MW.

Example 10

The electrical power system of any one of examples 1 to 3, wherein the electrical power system has a $NO_x$ emissions operating load ratio of less than 3 pounds per hour per MW.

Example 11

The electrical power system of any one of examples 1 to 3, wherein the electrical power system has a $NO_x$ emissions operating load ratio of less than 2 pounds per hour per MW.

Example 12

The electrical power system of any one of examples 1 to 3, wherein the electrical power system has a $NO_x$ emissions operating load ratio of less than 1 pound per hour per MW.

Example 13

The electrical power system of any one of examples 1 to 3, wherein the electrical power system has a $NO_x$ emissions operating load ratio of less than 0.5 pounds per hour per MW.

Example 14

The electrical power system of any one of examples 1 to 3, wherein the electrical power system has a $NO_x$ emissions operating load ratio of less than 0.1 pounds per hour per MW.

Example 15

The electrical power system of any one of examples 1 to 14, wherein a BOP frequency of the BOP electrical power is greater than an MDC frequency of the MDC electrical power.

Example 16

The electrical power system of example 15, wherein the MDC frequency is about 50 Hz and the BOP frequency is about 60 Hz.

Example 17

The electrical power system of example 16, wherein the MDC electrical power has a system voltage of about 13,800 volts to about 230,000 volts and the BOP electrical power has a voltage of about 13,800 to 69,000 volts.

Example 18

The electrical power system of any one of examples 1 to 16, wherein the MDC power network has an operating load capacity of about 100 MW to about 2,000 MW and the BOP power network has an operating load capacity of about 5 MW to about 100 MW.

Example 19

The electrical power system of example 18, wherein a total operating load is the sum of the operating load capacity of the MDC power network and the operating load capacity of the BOP power network, wherein the total operating load is about 400 MW to about 750 MW.

Example 20

The electrical power system of example 18, wherein the operating load capacity of the MDC power network is about 200 MW to about 800 MW and the operating load capacity of the BOP power network is about 40 MW to about 80 MW.

Example 21

The electrical power system of any one of examples 1 to 17, wherein each MDC train has an operating load capacity of about 150 MW to about 200 MW.

Example 22

The electrical power system of any one of examples 1 to 21, wherein the MDC power network comprises 2 MDC trains.

Example 23

The electrical power system of any one of examples 1 to 21, wherein the MDC power network comprises 2 MDC trains to about 8 MDC trains.

Example 24

The electrical power system of any one of examples 1 to 21, wherein the MDC power network comprises 2 MDC trains to about 12 MDC trains.

Example 25

The electrical power system of any one of examples 1 to 21, wherein the MDC power network comprises 2 MDC trains to about 15 MDC trains.

Example 26

The electrical power system of any one of examples 1 to 21, wherein the MDC power network comprises 2 MDC trains to about 20 MDC trains.

Example 27

The electrical power system of any one of examples 1 to 21, wherein each MDC train comprises 2 or more MDC turbine generators.

Example 28

The electrical power system of any one of examples 1 to 27, wherein the MDC turbine generator is a gas turbine generator, a combustion turbine generator, or a steam turbine generator.

Example 29

The electrical power system of any one of examples 1 to 28, further comprising an MDC control system operatively connected to the MDC power network and configured to monitor and control process operation parameters of the MDC power network.

Example 30

The electrical power system example 29, wherein the MDC turbine generator is a combustion turbine generator, and the MDC control system is operatively connected to the MDC turbine generator and configured to tune the MDC turbine generator with a dry low $NO_x$ (DLN) controller, and the DLN controller is configured to minimize the effects of combustion dynamics and reduce $NO_x$ emissions.

Example 31

The electrical power system of any one of examples 1 to 30, wherein the compressor is configured to be driven by the electric motor via direct on-line starting, an adjustable speed drive, or a motor soft starter.

Example 32

The electrical power system of any one of examples 1 to 31, further comprising an adjustable speed drive or a soft starter operatively coupled to the electric motor and configured to control the electric motor and the compressor.

Example 33

The electrical power system of any one of examples 1 to 32, wherein the compressor is configured to be driven by the electric motor via an adjustable speed drive or a motor soft starter, wherein the adjustable speed drive or the motor soft starter has a bypass connection coupled to and electrically connected to the MDC distribution bus.

Example 34

The electrical power system of any one of examples 1 to 33, further comprising a harmonic filter coupled to and electrically connected to the MDC distribution bus.

Example 35

The electrical power system of any one of examples 1 to 34, wherein the compressor is fluidly coupled to a process fluid line and configured to compress or move a process fluid within the process fluid line.

Example 36

The electrical power system of example 35, wherein the process fluid comprises natural gas, liquefied natural gas, methane, ethane, propane, butane, ethylene, propylene, ethyne, butadiene, hydrocarbons, syngas, carbon dioxide, hydrogen, nitrogen, nitrous oxide, water, gaseous derivatives thereof, liquefied derivatives thereof, supercritical derivatives thereof, or any mixture thereof.

Example 37

The electrical power system of any one of examples 1 to 36, further comprising one or more circuit breakers coupled to and electrically connected to the MDC distribution bus.

Example 38

The electrical power system of any one of examples 1 to 37, wherein the MDC turbine generator comprises: an MDC turbine configured to generate rotational energy; and an MDC power generator coupled to the MDC turbine and configured to convert the rotational energy of the MDC turbine into the MDC electrical power.

Example 39

The electrical power system of a example 38, further comprising a driveshaft coupled to the MDC turbine and the MDC power generator, wherein the driveshaft is configured to transfer the rotational energy of the MDC turbine to the MDC power generator.

Example 40

The electrical power system of examples 38, wherein the MDC turbine is fluidly coupled to and disposed between a high pressure side and a low pressure side of a working fluid circuit and configured to generate the rotational energy from a pressure drop in a working fluid within the working fluid circuit.

Example 41

The electrical power system of any one of examples 1 to 40, wherein the BOP turbine generator comprises: a BOP turbine configured to generate rotational energy; and a BOP power generator coupled to the BOP turbine and configured to convert the rotational energy of the BOP turbine into the BOP electrical power.

Example 42

An electrical power system, comprising: a motor driven compressor (MDC) power system comprising an MDC control system and one or more MDC trains and configured to generate and distribute MDC electrical power, wherein each MDC train comprises: an MDC turbine generator configured to generate the MDC electrical power; an MDC distribution bus electrically connected to the MDC turbine generator and configured to distribute the MDC electrical power; an electric motor electrically connected to the MDC distribution bus; and a compressor coupled to the electric motor and configured to be driven by the electric motor; and a balance of plant (BOP) power system configured to generate and distribute a BOP electrical power, wherein the BOP power network comprises: a BOP turbine generator configured to generate the BOP electrical power; a BOP distribution bus electrically connected to the BOP turbine generator and configured to distribute the BOP electrical power; and one or more plant circuits electrically connected to the BOP distribution bus and configured to be powered by the BOP electrical power, wherein the MDC power network and the BOP power network are electrically isolated from each other, have different electrical frequencies, and together have a total operating load capacity of less than 1,000 MW, and wherein the MDC control system is operatively connected to and configured to monitor and control process operation parameters of the MDC power network, the MDC control system is operatively connected to and configured to tune the MDC turbine generator with a dry low $NO_x$ (DLN) controller, and the DLN controller is configured to minimize the effects of combustion dynamics and maintain a total $NO_x$ emissions of less than 1,500 pounds per hour.

Example 43

A method for generating electricity, comprising: generating a motor driven compressor (MDC) electrical power and a balance of plant (BOP) electrical power in an electrical power network, wherein the MDC electrical power and the BOP electrical power have different electrical frequencies, and the electrical power system comprises: an MDC power network comprising one or more MDC trains and configured to generate and distribute the MDC electrical power; and a BOP power network configured to generate and distribute the BOP electrical power; compressing or moving a process fluid by a compressor, wherein the compressor is driven by an electric motor powered by the MDC electrical power; powering at least one auxiliary device by the BOP electrical power; and tuning one or more MDC turbine generators with a dry low $NO_x$ (DLN) controller to maintain a $NO_x$ emissions operating load ratio of less than 6.53 pounds per hour per MW, wherein the MDC turbine generators are powered by the MDC electrical power, wherein the $NO_x$ emissions operating load ratio is equal to a total sum of $NO_x$ emissions from the MDC and BOP power networks per a total sum of operating load capacities from the MDC and BOP power networks.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. An electrical power system, comprising:
a motor driven compressor power network powering a single motor driven compressor train and configured to generate and distribute motor driven compressor electrical power, wherein each motor driven compressor train comprises:
a motor driven compressor turbine generator configured to generate the motor driven compressor electrical power;
a motor driven compressor distribution bus electrically connected to the motor driven compressor turbine generator and configured to distribute the motor driven compressor electrical power;
an electric motor electrically connected to the motor driven compressor distribution bus, and
wherein the motor driven compressor is coupled to the electric motor and configured to be driven by the electric motor; and
a balance of plant power network configured to generate and distribute balance of plant electrical power, wherein the balance of plant power network comprises:
a balance of plant turbine generator configured to generate the balance of plant electrical power;
a balance of plant distribution bus electrically connected to the balance of plant turbine generator and configured to distribute the balance of plant electrical power; and
one or more plant circuits electrically connected to the balance of plant distribution bus and configured to be powered by the balance of plant electrical power,
wherein the motor driven compressor power network and the balance of plant power network are electrically isolated from each other.

2. The electrical power system of claim 1, wherein the electrical power system has a total operating load capacity of 400 MW to 750 MW and a total $NO_x$ emissions of less than 1,000 pounds per hour.

3. The electrical power system of claim 1, wherein the electrical power system has a total $NO_x$ emissions of 50 pounds per hour to 1,500 pounds per hour and a total $CO_2$ emissions of less than 750,000 pounds per hour.

4. The electrical power system of claim 1, wherein the electrical power system has a $NO_x$ emissions operating load ratio of less than 6.53 pounds per hour per MW.

5. The electrical power system of claim 1, wherein the electrical power system has a $NO_x$ emissions operating load ratio of less than 10.0 pounds per hour per MW.

6. The electrical power system of claim 1, wherein a balance of plant frequency of the balance of plant electrical power is greater than a motor driven compressor frequency of the motor driven compressor electrical power.

7. The electrical power system of claim 5, wherein the motor driven compressor frequency is 50 Hz and the balance of plant frequency is 60 Hz.

8. The electrical power system of claim 1, wherein the motor driven compressor power network has an operating load capacity of 100 MW to 2,000 MW and the balance of plant power network has an operating load capacity of 5 MW to 100 MW.

9. The electrical power system of claim 1, wherein each motor driven compressor train has an operating load capacity of 150 MW to 200 MW.

10. The electrical power system of claim 1, wherein the motor driven compressor power network comprises between 2 and 12 liquefaction trains.

11. The electrical power system of claim 1, wherein the motor driven compressor turbine generator is a combustion turbine generator or a steam turbine generator.

12. The electrical power system of claim 1, further comprising a motor driven compressor control system operatively connected to the motor driven compressor power network and configured to monitor and control process operation parameters of the motor driven compressor power network.

13. The electrical power system of claim 12, wherein the motor driven compressor turbine generator is a combustion turbine generator, and the motor driven compressor control system is operatively connected to the motor driven compressor turbine generator and configured to tune the motor driven compressor turbine generator with a dry low $NO_x$ (DLN) controller.

14. The electrical power system of claim 1, wherein the compressor is configured to be driven by the electric motor via direct on-line starting, an adjustable speed drive, or a motor soft starter.

15. The electrical power system of claim 1, wherein the compressor is configured to be driven by the electric motor via an adjustable speed drive or a motor soft starter, wherein the adjustable speed drive or the motor soft starter has a bypass connection coupled to and electrically connected to the motor driven compressor distribution bus.

16. The electrical power system of claim 1, further comprising a harmonic filter coupled to and electrically connected to the motor driven compressor distribution bus.

17. The electrical power system of claim 1, wherein the compressor is fluidly coupled to a process fluid line and configured to compress a process fluid within the process fluid line.

18. The electrical power system of claim 17, wherein the process fluid comprises natural gas, liquefied natural gas, methane, ethane, propane, butane, ethylene, propylene, ethyne, butadiene, hydrocarbons, syngas, carbon dioxide, hydrogen, nitrogen, nitrous oxide, water, gaseous derivatives thereof, liquefied derivatives thereof, supercritical derivatives thereof; or any mixture thereof.

19. An electrical power system, comprising:
a motor driven compressor power network comprising:
a motor driven compressor control system;
one or more motor driven compressor trains;
wherein the motor driven compressor power network is configured to generate and distribute motor driven compressor electrical power, and
wherein each motor driven compressor train comprises:
a motor driven compressor turbine generator configured to generate the motor driven compressor electrical power;
a motor driven compressor distribution bus electrically connected to the motor driven compressor turbine generator and configured to distribute the motor driven compressor electrical power; an electric motor electrically connected to the motor driven compressor distribution bus; and
a compressor coupled to the electric motor and configured to be driven by the electric motor; and
a balance of plant power system configured to generate and distribute a balance of plant electrical power, wherein the balance of plant power network comprises:

a balance of plant turbine generator configured to generate the balance of plant electrical power;
a balance of plant distribution bus electrically connected to the balance of plant turbine generator and configured to distribute the balance of plant electrical power; and
one or more plant circuits electrically connected to the balance of plant distribution bus and configured to be powered by the balance of plant electrical power,
wherein the motor driven compressor power network and the balance of plant power network being electrically isolated from each other, have different electrical frequencies, and together have a total operating load capacity of less than 2,400 MW,
wherein the motor driven compressor control system is operatively connected to and configured to monitor and control process operation parameters of the motor driven compressor power network,
wherein the motor driven compressor control system is operatively connected to and configured to tune the motor driven compressor turbine generator with a dry low NO, (DLN) controller, and
wherein the electrical power system has total NO, emissions of less than 1.500 pounds per hour.

20. A method for generating electricity, comprising:
generating motor driven compressor electrical power and balance of plant electrical power in an electrical power system, wherein the motor driven compressor electrical power and the balance of plant electrical power have different electrical frequencies and the electrical power system comprises:
a motor driven compressor power network comprising one or more motor driven compressor trains and configured to generate and distribute the motor driven compressor electrical power; and
a balance of plant power network configured to generate and distribute the balance of plant electrical power;
compressing a process fluid by a compressor, wherein the compressor is driven by an electric motor powered by the motor driven compressor electrical power; and
powering at least one auxiliary device by the balance of plant electrical power,
wherein a $NO_x$ emissions operating load ratio is less than 6.53 pounds per hour per MW,
wherein the motor driven compressor turbine generators are configured to generate the motor driven compressor electrical power, and
wherein the $NO_x$ emissions operating load ratio is equal to a total sum of NO. emissions from the motor driven compressor and balance of plant power networks per a total sum of operating load capacities from the motor driven compressor and balance of plant power networks.

* * * * *